Patented Oct. 30, 1923.

1,472,332

UNITED STATES PATENT OFFICE.

PAUL HILDEBRANDT, OF HAMBURG, GERMANY, ASSIGNOR, BY MESNE ASSIGNMENTS, TO THE CHEMICAL FOUNDATION, INC., A CORPORATION OF DELAWARE.

PROCESS FOR THE PRODUCTION OF A PRESERVED MEAT-EXTRACT-LIKE PREPARATION FROM FISH FLESH.

No Drawing.     Application filed December 26, 1917.   Serial No. 208,866.

*To all whom it may concern:*

Be it known that I, PAUL HILDEBRANDT, citizen of the Empire of Germany, residing at Hamburg, Germany, have invented new and useful Improvements in a Process for the Production of a Preserved Meat-Extract-Like Preparation from Fish Flesh, of which the following is a specification.

The consumption of preparations from fish has lately increased considerably. However, their palatability is greatly impaired by the peculiar fishy taste, adhering more or less to all kinds of fish, even if the preparations are made from fresh fish. If fish are employed which are not in a very fresh condition the nauseous smell and taste are especially pronounced and all efforts to overcome that drawback have failed hitherto. My investigations have shown, that such fishy taste is due to certain substances, among others fatty acids, which are quickly formed in the flesh of fish by decomposition. I have found that these substances can be removed by extraction of the fish-flesh with alkaline solutions or with fat solvents. Preferably the fish are previously dried before being extracted with fat solvents. By that treatment a preparation is produced, which possesses a rather indifferent taste, but which is still somewhat fishy and therefore altogether unfit for human food, although its nourishing value is very great.

The object of the present invention is to solve the problem of the practical utilization of fish-flesh. The process is of special importance in all those cases, where it is not only intended to obtain a palatable fish preparation, but also to produce a preparation that will keep for any reasonable length of time, whereby the perishable goods hitherto in the market will gradually disappear and the consumption of fish preparations will increase to a very great extent.

I have found that the mixture of amino-acids, obtained from albumen by hydrolysis are the carriers of the characteristic taste of meat and I also found that those substances obtained by hydrolysis have the property of preserving fish for a very long time from decomposition. The addition of the substances above mentioned therefore results in giving fish preparations the taste so characteristic of meat and furthermore to impart to them the property of preserving fish preparations for any practical length of time, by preventing decomposition.

In practice, I apply my invention by treating the fish in dilute alkaline solution for some time and afterwards impregnating the fish-flesh, while still in a moist state, with the mixture of amino-acids obtained by hydrolyzing albumen. Instead of treating fish with alkaline solutions, I may also apply fat solvents, in which case the fish must be previously dried. In this way the preservation of fish-flesh is secured. However, it is best to concentrate the mixture of the amino-acids to a syrupy state and to mix that syrup with the comminuted mass of fish-flesh. The paste thus obtained can be directly employed as a human food, or as an addition to provisions of all kinds, or as a material for making sausages.

What I claim is:—

1. A process for the manufacture of a preserved meat-like preparation from fish-flesh, consisting in removing fat from fish-flesh and afterwards impregnating the mass with a mixture of amino-acids obtained from albumen by hydrolysis, substantially as described.

2. A process for the manufacture of a preserved meat-like preparation from fish-flesh, consisting in mixing comminuted fish-flesh with a mixture of amino-acids obtained from albumen by hydrolysis, substantially as described.

In testimony whereof I have signed my name to this specification in the presence of two subscribing witnesses.

PAUL HILDEBRANDT.

Witnesses:
EDUARD SIEBRAUR,
WALTER AHRENS.